No. 799,353. PATENTED SEPT. 12, 1905.
J. U. MOORE.
INCUBATOR NEST.
APPLICATION FILED DEC. 31, 1904.

Witnesses
E. O. F. Stewart
C. N. Woodward

John U. Moore, Inventor.
by C. A. Snow & Co
Attorneys

UNITED STATES PATENT OFFICE.

JOHN U. MOORE, OF MORROW, OHIO.

INCUBATOR-NEST.

No. 799,353.  Specification of Letters Patent.  Patented Sept. 12, 1905.

Application filed December 31, 1904. Serial No. 239,178.

*To all whom it may concern:*

Be it known that I, JOHN U. MOORE, a citizen of the United States, residing at Morrow, in the county of Warren and State of Ohio, have invented a new and useful Incubator-Nest, of which the following is a specification.

This invention relates to incubators, and has for its object to produce a simply-constructed and easily-operated device whereby the nest portion of apparatus of this character is movably connected to the casing to enable it to be readily moved therefrom when the eggs require attention and as quickly and as readily restored when required.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of the advantages.

Figure 1:
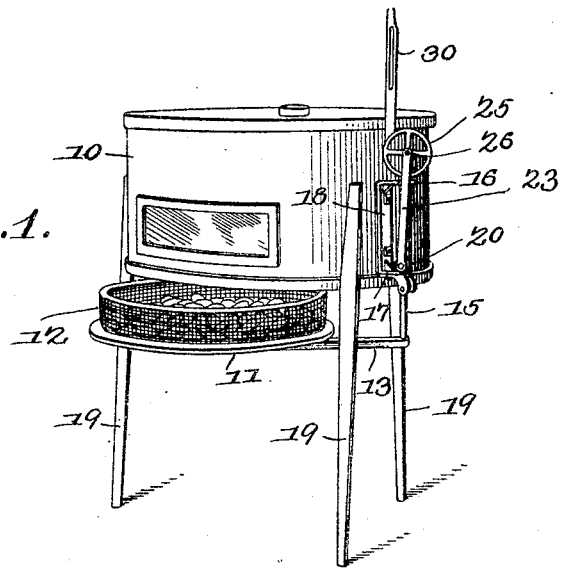
Figure 3:
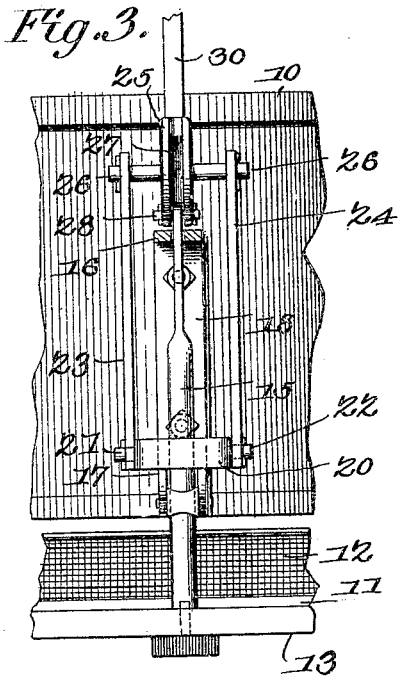
Figure 2:
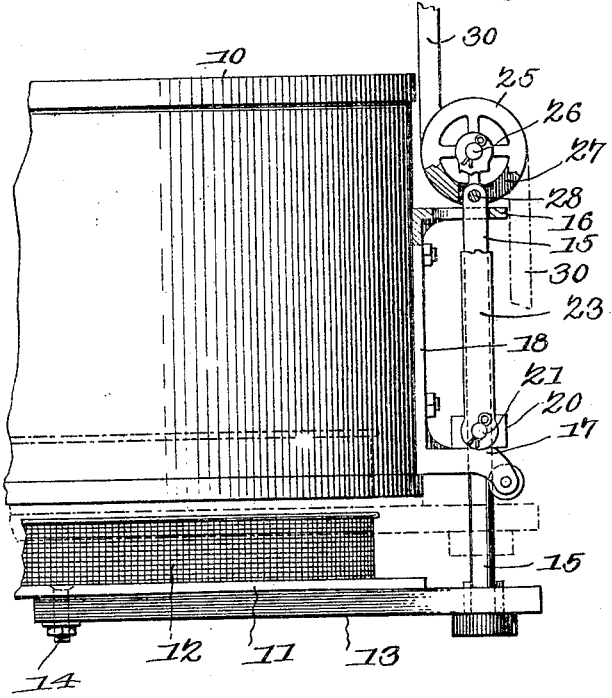

In the drawings thus employed, Figure 1 is a perspective view of an incubator with the improvements applied. Fig. 2 is a side elevation, and Fig. 3 is an end elevation, of a portion of an incubator with the improvements applied and with parts in section.

The improved device may be attached to any form or style of incubator-casing, (represented at 10,) but preferably circular; and it consists of a nest or receptacle for the eggs, preferably with an imperforate bottom 11 and with the sides having ventilating-openings and preferably formed of wire-netting or the like, as at 12.

The nest portion is mounted for rotation upon a bar or arm 13, as by a central pivot-bolt 14, the bar extending beyond the casing and provided at its free end with a vertical standard 15, the latter movable vertically through spaced bearings 16 17, extending from a bracket 18, attached to the side of the casing, the standard being also rotative in the bracket-bearings, so that the nest can be lowered and then swung laterally, as required.

The nest will be small enough to permit of its passage laterally between the supporting-lugs 19 of the casing 10 and when lowered and swung laterally will extend partially beyond the casing, so that every egg in the nest is readily accessible by rotating the nest upon its central pivot.

Surrounding the standard 15 and resting upon the lower bracket-bearing 17 is a collar 20, and pivoted at 21 22 to this collar are supporting-bars 23 24 and with a wheel 25 mounted for rotation by its axle 26 in the upper ends of the bars. The wheel 25 has a central peripheral recess 27, through which a pin 28 passes.

The wheel 25 is provided with an operating-handle 30 extending from one side, and it will be obvious that when the lever is moved into its downward position, as indicated by dotted lines in Fig. 2, the standard 15, together with its attached "nest" 11 12, will be elevated and the imperforate bottom 11 impinged against the bottom of the casing 10 and locked in that position, and then when it is required to inspect the contents of the nest or to place eggs therein or remove them therefrom or to "turn" the eggs therein the nest can be readily lowered and swung to one side and rotated, as before described. When in elevated position, the pivot member 28 of the wheel 25 will be thrown slightly in advance of the center line of the axle 26, so that the standard and nest will be "locked" in elevated position and require no other fastening means to maintain it in position.

The device is simple in construction, efficient in action, and enables the eggs to be inspected and cared for with the minimum of labor and time, and thus secure uniform results, which are essential in devices of this character.

Having thus described the invention, what is claimed is—

1. In an incubator, a casing open at the lower side, in combination with a nest for the eggs detachably connected to said casing and insertible into and removable downwardly and swinging laterally from said casing.

2. In an incubator, a casing open at the lower side, a nest for the eggs detachably fitting into said open side, a supporting means for said nest, means for moving said nest vertically, and means for swinging said supporting means and the nest carried thereby laterally.

3. In an incubator, a casing open at the lower side, a nest for the eggs detachably fitting into said open side, a supporting means having said nest mounted for rotation thereon, means for moving said supporting means and the nest carried thereby vertically, and means for swinging said supporting means laterally.

4. In an incubator, a casing open at the lower side, a bracket connected to said casing, a standard mounted for rotative and longitudinal movement in said bracket, an arm extending laterally from said standard, a nest for the eggs mounted for rotation upon said arm, and means for moving said standard and the arm and nest carried thereby vertically to insert said nest into and remove it from said casing.

5. In an incubator, a casing open at the lower side, a bracket connected to said casing, a standard mounted for rotative and longitudinal movement in said bracket, an arm extending laterally from said standard, a nest for the eggs mounted for rotation upon said arm, a collar mounted loosely upon said standard and bearing upon said bracket, spaced rods movably connected by one end to said collar, a wheel rotatively connected to the other ends of said rods and provided with an operating-handle, and means for movably coupling said wheel to said standard.

In testimony that I claim the foregoing as my own I have hereto affixed my signature in the presence of two witnesses.

JOHN U. MOORE.

Witnesses:
H. H. COUDEN,
G. L. HENRY.